May 5, 1959　　　J. M. BURKE　　　2,885,095
COUPLER OPERATING DEVICE
Filed July 18, 1955　　　　　　　　　2 Sheets-Sheet 2

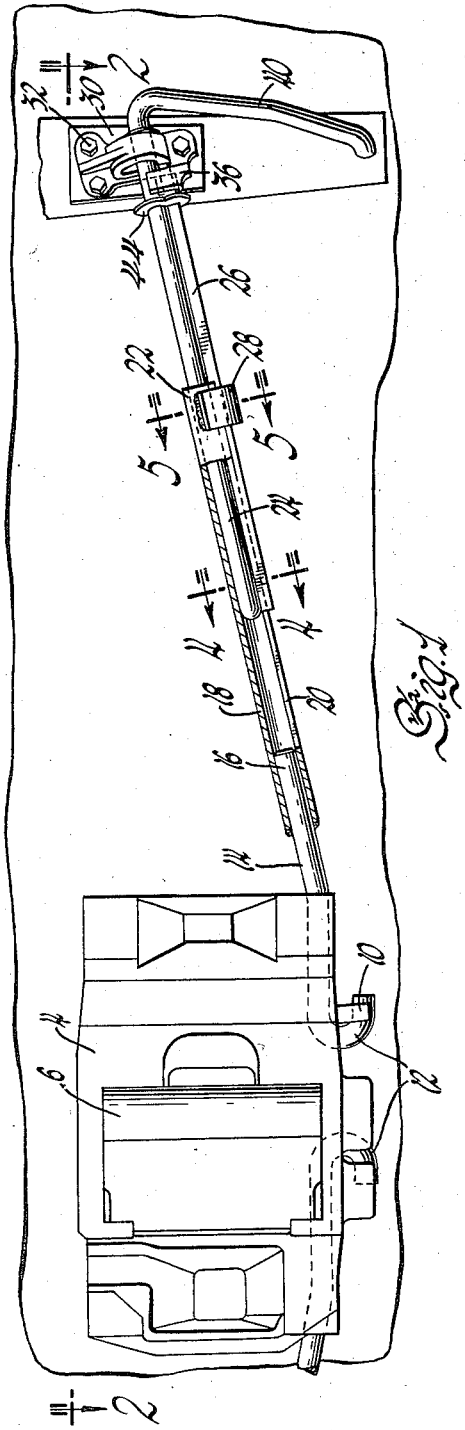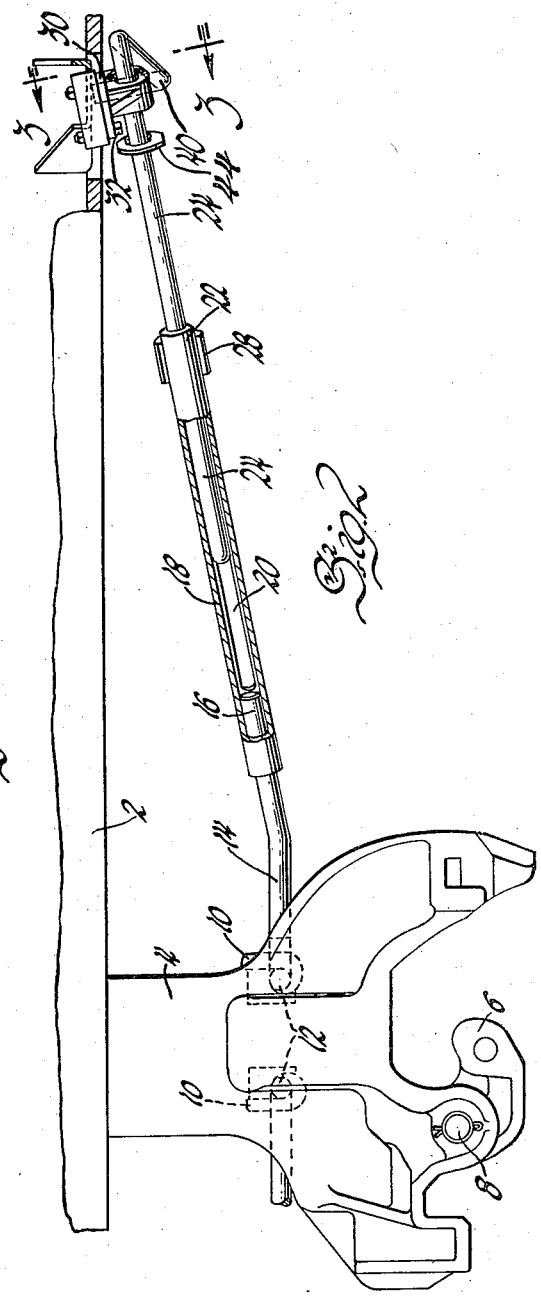

INVENTOR
Joseph M. Burke
BY J. C. Thorpe
ATTORNEY

United States Patent Office 2,885,095
Patented May 5, 1959

2,885,095

COUPLER OPERATING DEVICE

Joseph M. Burke, Naperville, Ill., assignor to General Motors Corporation, Detroit, Mich., a corporation of Delaware Application July 18, 1955, Serial No. 522,689

3 Claims. (Cl. 213—166)

This invention relates to coupler mechanisms and more particularly to means for operating a coupler from the side of a railway vehicle.

The primary object of the invention is to form the operating device for a car coupler of two component parts having a common axis and to connect such parts so as to permit relative longitudinal movement therebetween along said axis and to transmit rotary movement from one part to the other about said axis without any eccentric motion.

Previously, couplers of this type have been opened by one or more rods eccentrically connected together which allow a certain amount of relative movement therebetween so as to compensate for the swing of the coupler. This type of coupler actuating device, however, has never been completely satisfactory due to the eccentric action of the parts of the device. The operating parts extend transversely or laterally from one side of the front end or rear end of the vehicle toward the coupler. Of necessity the air hose connections for connecting adjacent ends of vehicles must be in close proximity to these operating parts and in most cases, when disconnected, hang down against the operating mechanism for the coupler. Due to the eccentric action of these prior coupler-operating mechanisms it is necessary for the person attempting to "set" the knuckle of the coupler to operate the mechanism against the weight of these air hose connections. The increased amount of brake rigging has added to the weight of these hose connections and the point has been reached where the average operator finds it extremely difficult if not impossible to operate the coupler mechanism. In any case the additional effort required to be exerted creates a dangerous condition as it tends to throw the person operating the operating mechanism off balance, etc. The present invention has been developed to overcome these difficulties by providing an operating mechanism or device for the coupler which comprises telescoping parts whose longitudinally extending axes are coincident so that any rotary movement of these parts about the common axis or any longitudinal movement along this axis is not materially affected by any weight resting against these parts, i.e., the weight of the hose connections, etc.

For a fuller understanding of this invention and the objects thereof reference may be had to the accompanying detailed description and drawings, in which:

Fig. 1 is an end elevation of a portion of a railway vehicle embodying the invention.

Fig. 2 is a top plan view of the mechanism illustrated in Fig. 1.

Figure 3:
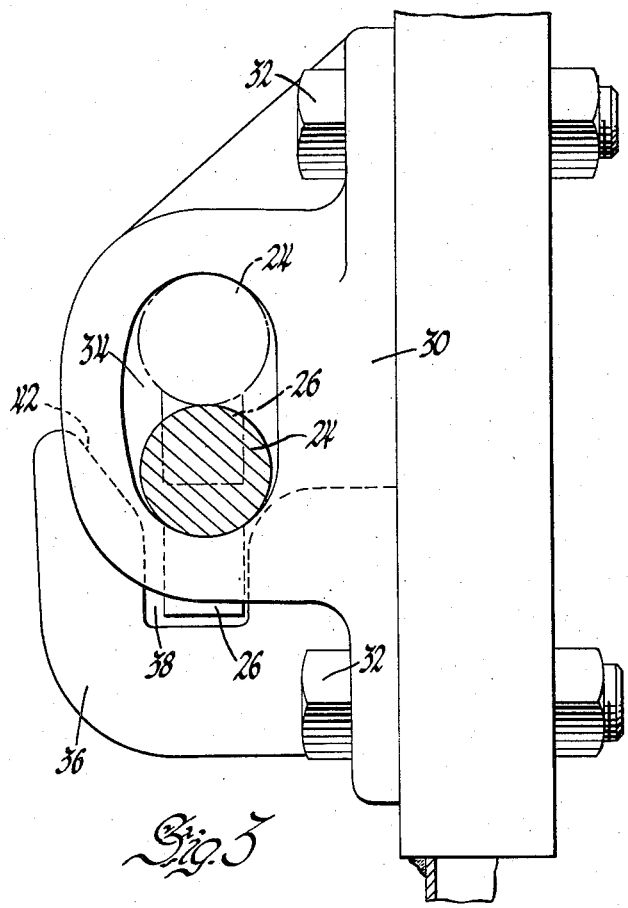
Fig. 3 is a side elevation of the bracket supporting the outer end of the operating device enlarged to show its unique details of construction.
Figure 4:
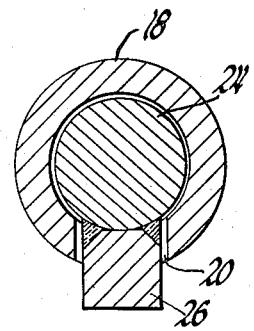
Fig. 4 is a view in section normal to the longitudinal axis of the device taken on the line 4—4 of Fig. 1.
Figure 5:
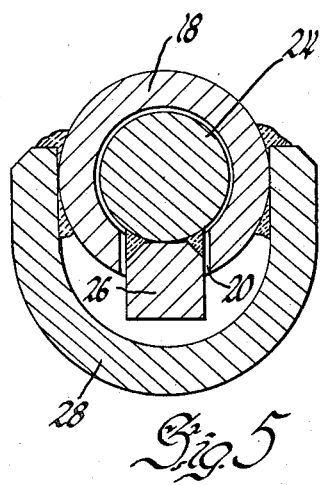
Fig. 5 is a similar view in section normal to the axis of the operating device being taken on the line 5—5 of Figure 1 to illustrate the means for reinforcing the outer telescoping portion of the device.

Referring now to the drawings, the railway vehicle is provided with the usual end sill 2 and associated parts cooperating with the coupler 4, said coupler being of the usual A.A.R. tightlock-type-H coupler and including a movable knuckle 6 pivoted at 8 to the coupler head. The operating mechanism or device includes the link 10 for controlling the operation of the knuckle 6 and operates the usual mechanism within the coupler head and is controlled by the hook-shaped end 12 received in the usual eye in the link 10. The hooked end 12 is a part of a rod 14 having an opposite end 16 to which is suitably secured, as for example by welding, a tubular or outer telescoping member 18. The member 18 is provided with a longitudinally extending slot 20 beginning from a point intermediate the ends thereof to its opposite end 22. Received within the outer member 18 is an inner telescoping member 24 in the form of a rod or bar whose axis is coincident with the axis of the member 18. The member 24 is provided with a longitudinally extending key 26 along a substantial portion of the length thereof which is received in the slot 20 and adapted to slide longitudinally therealong to accommodate swinging movement of the coupler 4. In order to reinforce the end 22 of the outer member 18 a reinforcing piece or bracket 28 has been provided which is welded to opposite sides of the member 18 and extends around and embraces, without engaging, the key 26. The upper or outer end of the device and specifically the member 24 is supported by means of a bracket 30 fixed to the railway vehicle, as for example by the studs 32. The bracket 30 is provided with a generally elliptical opening 34 through which the member 24 extends. Located slightly inboard of and also formed as a part of the bracket 30 is a locking lug 36 which is provided with a slot 38 for the reception of one end of the key 26 so as to prevent rotation of either of the members 18 or 24 when the key 26 is received therein. A washer 44 on rod 24 limits or restricts longitudinal movement of rod 24 relative to bracket 30.

The operation of the device is as follows: Should it be desired to "set" the knuckle of the coupler 4 the handle 40, which is formed by bending the outboard end of the member 24, is lifted vertically in the elliptical opening 34 as shown in phantom in Fig. 3 so as to lift the key 26 out of the slot 38. The handle 40 may then be rotated causing rotation of the member 24 and (because of key 26) rotation of the members 18 and 16 including the hooked end 12. This rotational movement of hooked end 12 will "set" the knuckle 6 of the coupler 4 in well known manner. It will be observed that once the knuckle has been "set" the handle 40 as well as the key 26 will be turned so that the key 26 actually engages the surface 42 which forms a part of the locking lug 36. The key, including the members 24 and 18, will remain in this turned position until the knuckle 6 is returned to the position shown by a coupling of vehicles or else manually by personnel again operating the handle 40 at which time the key 26 will be turned so as to fall back into the slot 38.

From the foregoing description it may be appreciated that the operating device for setting the knuckle of the coupler does not rotate eccentrically but all rotation takes place about the coincident axes of the telescoping members and all longitudinal movements take place along these axes. This eliminates any lifting or forces being applied to any apparatus such as hoses or hose connections which might be lying against this linkage thereby making it much easier for personnel to operate.

The operating device just described is also believed to eliminate any tendency for the relatively movable members to bind with the possibility of failure which might

What I claim is:

1. In a railway vehicle or the like, the combination of a movable coupler, a bracket, and an operating device operatively attached to the coupler and supported at its outer end by said bracket, said operating device comprising a pair of telescoping parts having coincident axes, the outer of said parts having a longitudinally extending slot therein extending from one end thereof to a point intermediate the ends thereof, the other of said parts having a key received in and slidable in said slot whereby said parts are connected together to permit relative longitudinal movement therebetween along said axes and to transmit rotary movement from one part to the other about said axis, and a reinforcing member non-engageably embracing said slot adjacent the end of the one of said parts from which said slot extends to said point intermediate the ends thereof.

2. In a railway vehicle or the like, the combination of a movable coupler, a bracket, and an operating device operatively attached to the coupler and supported at its outer end by said bracket, said operating device comprising a pair of telescoping parts having coincident axes, the outer of said parts having a longitudinally extending slot therein extending from one end thereof to a point intermediate the ends thereof the other of said parts having a key at least a portion of which is received in and slidable in said slot whereby said parts are connected together to permit relative longitudinal movement therebetween along said axes and to transmit rotary movement from one part of the other about said axis, a reinforcing member non-engageably embracing said slot adjacent the end of the one of said parts from which said slot extends to said points intermediate the ends thereof, said bracket including slotted means adapted to receive another portion of said key to selectively prevent rotary movement of said operating device.

3. In a railway vehicle or the like, the combination of a movable coupler, a bracket, and an operating device operatively attached to the coupler and supported at its outer end by said bracket, said operating device comprising a pair of telescoping parts having coincident axes, the outer of said parts having a longitudinally extending slot therein extending from one end thereof to a point intermediate the ends thereof, the other of said parts having a key at least a portion of which is received in and slidable in said slot whereby said parts are connected together to permit relative longitudinal movement therebetween along said axes and to transmit rotary movement from one part to the other about said axis, a reinforcing member non-engageably embracing said slot adjacent the end of one of said parts from which said slot extends to said point intermediate the ends thereof, said bracket including slotted means receiving another portion of said key to selectively prevent rotary movement of said operating device, and limiting means adjacent said bracket to restrict the outward longitudinal movement of one of said parts along said axis.

References Cited in the file of this patent

UNITED STATES PATENTS

| 1,182,207 | Pries | May 9, 1916 |
| 1,828,087 | Ulcek | Oct. 20, 1931 |
| 2,050,497 | McCollum | Aug. 11, 1936 |
| 2,356,336 | Metzger | Aug. 22, 1944 |